Oct. 26, 1965        F. C. HUTTO        3,213,766
               LIGHT WEIGHT PISTON
Filed March 20, 1964                    3 Sheets-Sheet 1
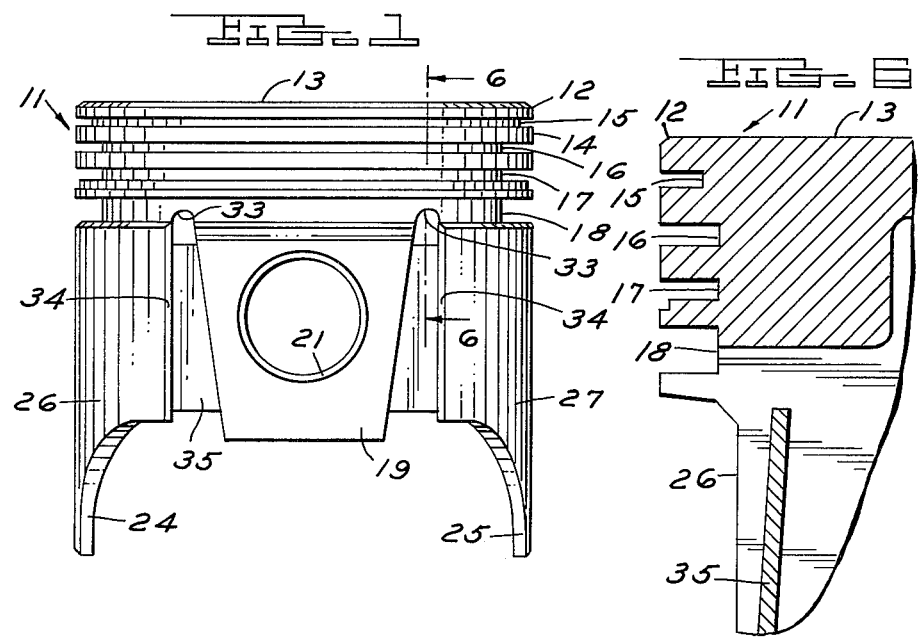
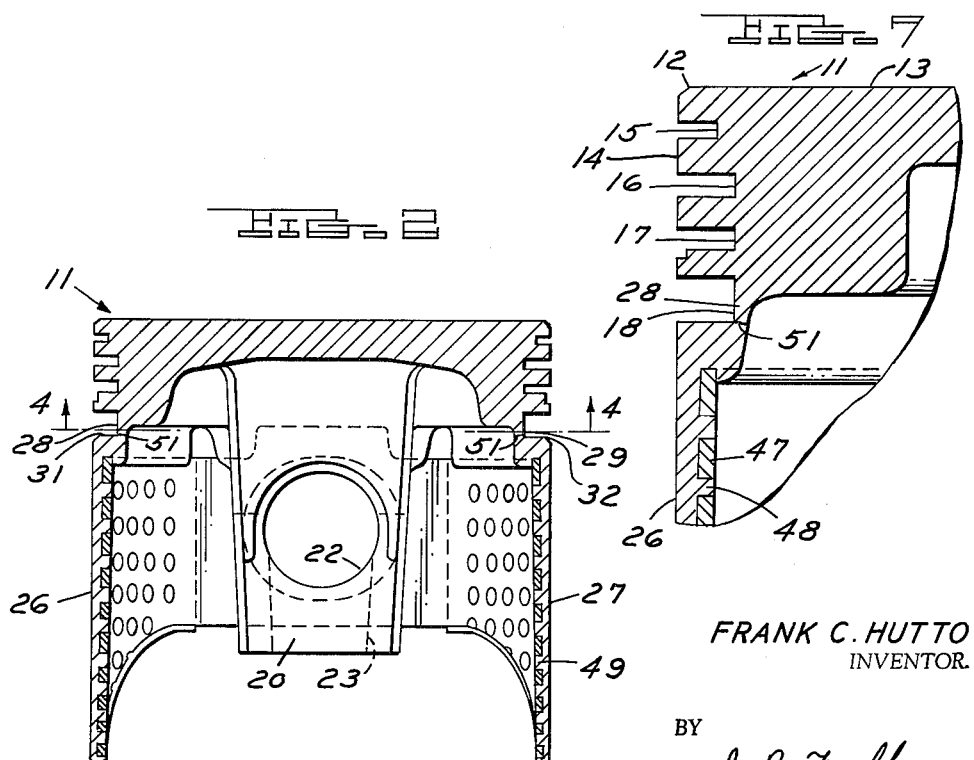
FRANK C. HUTTO
INVENTOR.
BY
J. R. Faulkner
E. A. Beutler
ATTORNEYS

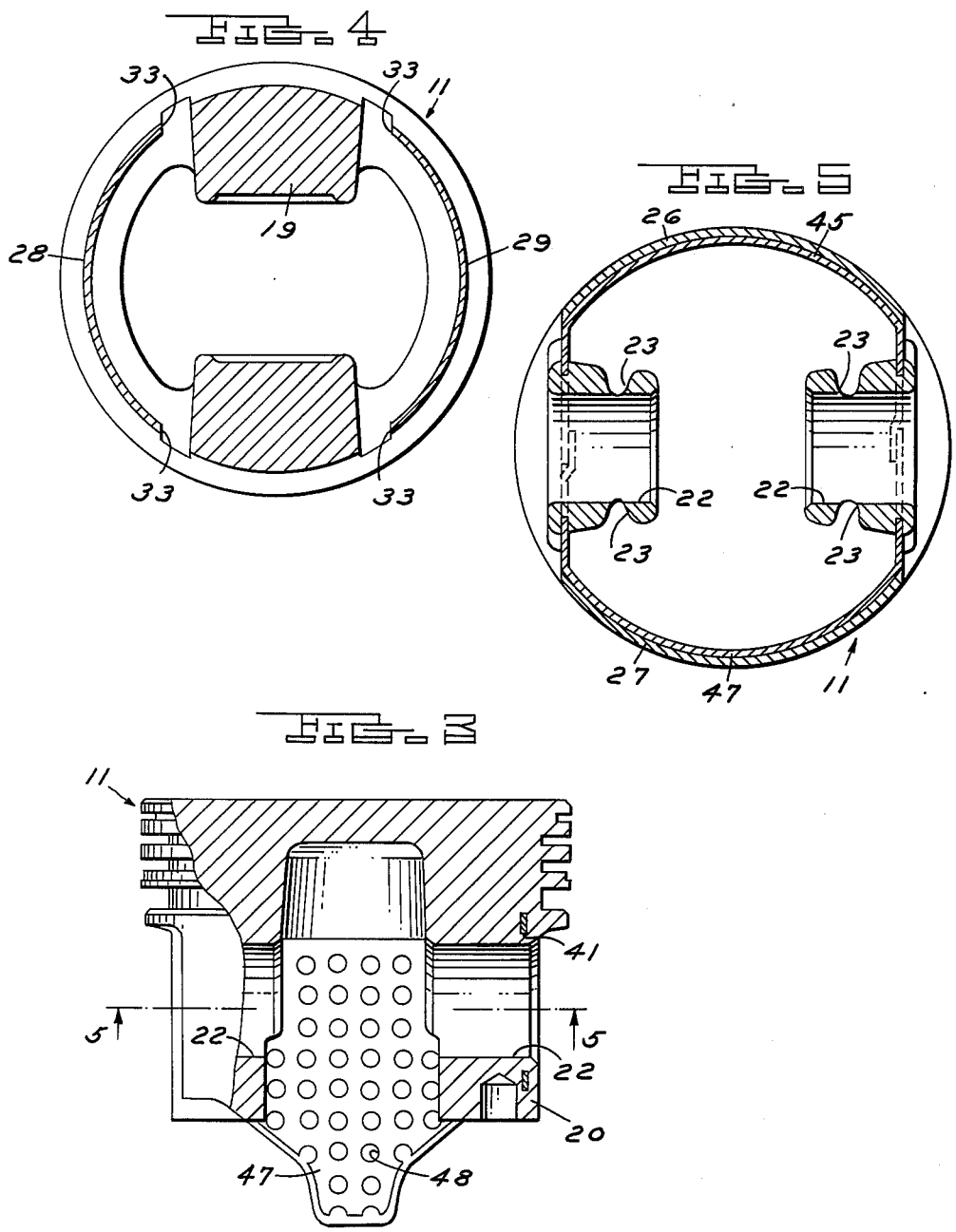

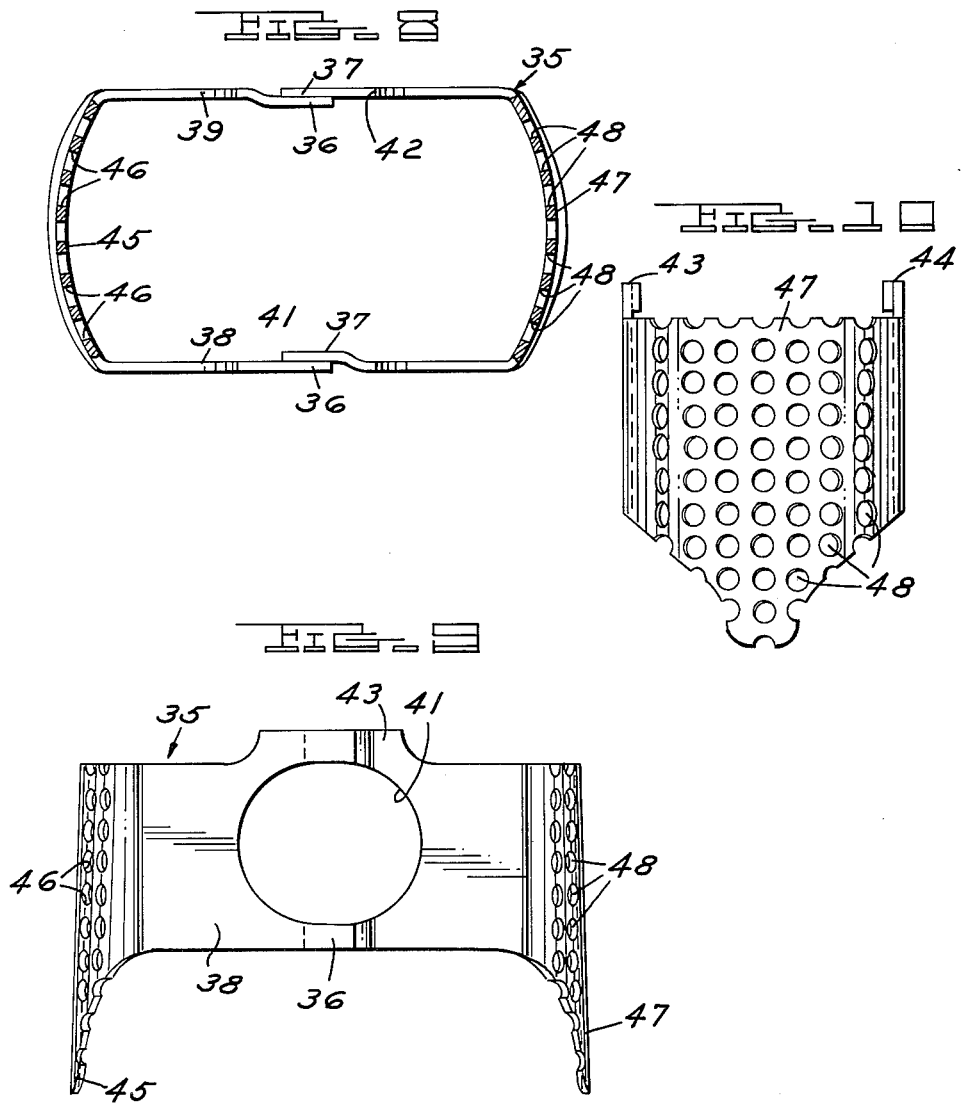

United States Patent Office 3,213,766
Patented Oct. 26, 1965

3,213,766
LIGHT WEIGHT PISTON
Frank C. Hutto, Dearborn, Mich., assignor to Ford Motor Company, Dearborn, Mich., a corporation of Delaware
Filed Mar. 20, 1964, Ser. No. 353,385
9 Claims. (Cl. 92—228)

This invention relates to a piston for an internal combustion engine and more particularly to an improved, light weight piston.

It is now common practice in high speed internal combustion engines to employ pistons formed from aluminum or other similar light weight metals or alloys. Considerable cost savings can be realized through the use of light weight pistons since the weight of other engine parts may be reduced accordingly. For example, since the reciprocating mass is decreased the counter balancing mass of the crankshaft also can be reduced. In addition, the decreased inertial forces exerted upon the crankshaft, crankshaft bearings, connections rods, and connecting rod bearings permits simplification of these parts with attendant cost savings.

The use of light weight metals in the fabrication of pistons, however, presents several problems. The light weight metals commonly employed have a high coefficient of thermal expansion and a high coefficient of thermal conductivity. The cylinder in which the piston reciprocates is generally formed from cast iron, which has a lower coefficient of thermal expansion, and the piston and the cylinder bore expand unequally. Since the piston diameter grows more rapidly than the cylinder bore as the temperature increases, the piston must be fitted loosely within the cylinder bore when the engine is cold to preclude seizure when operating temperatures are reached. The loosely fitted piston produces an objectionable noise known as "piston slap."

To reduce piston slap and to permit more arcuate sizing of the piston within the cylinder bore it has been proposed to use some form of insert that is cast into the piston to reduce or resist thermal growth. The use of the expansion controlling insert adds greatly to the cost of piston fabrication. The inserts must be accurately located in the piston mold when the piston is being cast and additional piston material must be employed to retain the insert.

It is a further practice in the fabrication of conventional light weight pistons to machine a circumferential slot between the lower edge of the piston head and the upper edge of the cylinder wall engaging skirt portion. The slot is formed adjacent the diameter of the piston that is normal to the piston pin axis. The slots axially separate the skirts from the piston head. The additional machining operation is, of course, costly.

It is the principal object of this invention to provide an improved light weight piston for an internal combustion engine.

It is a still further object of this invention to provide a piston in which the cylinder wall engaging skirts are not integrally connected to the piston head or piston pin bosses so that they will not experience the thermal expansion of these parts.

It is a still further object of this invention to produce a light weight piston in which the upper edges of the cylinder wall engaging skirts are axially separated from the head portion automatically during fabrication of the piston.

Further objects and advantages of this invention will become more apparent when considered in conjunction with the accompanying drawings, wherein:

FIGURE 1 is a side elevational view of a piston for an internal combustion engine embodying this invention.

FIGURE 2 is a cross-sectional view of the piston shown in FIGURE 1 taken along the diameter normal to the piston pin axis.

FIGURE 3 is a partial cross-sectional view taken substantially along the diameter of the piston containing the piston pin axis.

FIGURE 4 is a cross-sectional view taken along the line 4—4 of FIGURE 2.

FIGURE 5 is a cross-sectional view taken along the line 5—5 of FIGURE 3.

FIGURE 6 is a cross-sectional view taken along the line 6—6 of FIGURE 1.

FIGURE 7 is an enlarged cross-sectional view taken in the same plane as FIGURE 2 showing the interrelation of the head portion to the skirt.

FIGURE 8 is a top plan view of the inner skirt of the piston shown in FIGURE 1.

FIGURE 9 is a front elevational view of the inner skirt.

FIGURE 10 is a side elevational view of the inner skirt.

Referring now in detail to the drawings and in particular to FIGURES 1–5, a light weight piston embodying this invention is indicated generally by the reference numeral 11. The piston 11 is formed primarily from any of the known aluminum alloys or any other similar light weight metal. The inner surface of the piston 11 is designed so that the piston may be cast using a single permanent core.

The piston 11 includes a head portion 12 having a substantially flat upper surface 13 surrounded by a generally cylindrical piston ring belt area 14. A blind upper circumferential groove 15 is formed in the piston ring belt area 14 adjacent the upper surface 13. The blind groove 15 will confine a volume of air during reciprocation of the piston to provide a limited degree of insulation for the piston rings that are received in the lower grooves, now to be described.

First and second compression ring grooves 16 and 17 are formed in the piston ring belt area 14 below the blind groove 15. Compression rings of any known type (not shown) may be inserted into the compression ring grooves 16 and 17. An oil ring groove 18 is formed at the lower end of the piston ring belt area 14. An oil control ring of any known type may be inserted into the oil ring groove 18.

Piston pin bosses 19 and 20 depend from the head portion 12 at diametrically opposite sides of the piston 11. The piston pin bosses 19 and 20 are in the form of inverted, truncated pyramids to permit permanent mold casting of the piston 11. Aligned piston pin journals 21 and 22 are formed in the piston pin bosses 19 and 20, respectively, to receive a piston pin that connects the piston 11 to a connecting rod (not shown). If desired, lubricating grooves 23 of the type described in my co-pending patent application entitled Piston, filed March 20, 1964, serial No. 353,384, may be provided in the piston pin bosses 19 and 20.

A pair of slipper shaped skirt pads 24 and 25 are formed on diametrically opposite sides of the piston 11. The skirt pads 24 and 25 have cylinder wall engaging surfaces 26 and 27 that extend between the piston pin bosses 19 and 20. The outer surfaces of the piston pin bosses 19 and 20 are disposed radially inwardly from the head portion 14 and the cylinder wall engaging surfaces 26 and 27 (FIGURE 5) so that the surfaces 26 and 27 are the only portions of the piston 11 that contact the cylinder wall.

Thin arcuate sections 28 and 29 (FIGURES 2 and 7) connect the upper ends of the skirt pads 24 and 25 with the head portion 12. Machined upper surfaces 31 and 32 of the skirt surfaces 26 and 27 form a lower surface of the oil ring groove 18. Arcuate recesses 33 formed at each end of the thin arcuate sections 28 and 29 circumferentially separate these sections from the piston pin bosses 19 and 20. The recesses 33 also permit the oil wiped from the cylinder wall by the oil control ring to return to the crankcase from the inner side of the oil ring groove 18.

The cylinder wall engaging surfaces 26 and 27 of the skirt pads 24 and 25 terminate at each side in edge portions 34 that are aligned with the arcuate recesses 33 and cirmumferentially spaced from the side surfaces of the piston pin bosses 19 and 20. The skirt pads 24 and 25 are supported, however, by the bosses 19 and 20 by an inner skirt, indicated generally by the reference numeral 35 and shown in greater detail in FIGURES 8-10.

The inner skirt 35 is formed from two pieces of sheet steel having overlapping ends 36 and 37 positioned at each side of the piston in the area of the piston pin bosses. The overlapping ends 36 and 37 are secured together by spot welding or some other suitable manner to form a unitary assembly. The inner skirt 35 comprises opposing first and second sections 38 and 39 each of which lies in a plane that is normal to the axis of the piston pin journals 21 and 22. Enlarged apertures 41 and 42 formed in the sections 38 and 39 are coaxially disposed with the piston pin journals 21 and 22 when the inner skirt 35 is received in the piston 11. The apertures 41 and 42 are larger in diameter than the journals 21 and 22. Raised tabs 43 and 44 may be formed above the apertures 41 and 42, if desired.

At one end the sections 38 and 39 are joined by an integral, arcuate section 45 that has a gradually increasing length (FIGURE 10). The length is a maximum on the diameter of the piston 11 normal to the axis of the piston pin journals 21 and 22. The arcuate section 45 is provided with a plurality of perforations 46 for a purpose to be described. The other ends of the sections 38 and 39 are joined by an integral, arcuate section 47 that is identical in shape to the section 45 and is also provided with a plurality of perforations 48.

When the piston 11 is being cast, the inner skirt 35 is positioned within the piston mold and the molten metal that forms head portion 12, piston pin bosses 19 and 20 and skirt pads 24 and 25 is poured around the inner skirt 35. The molten metal flows through the perforations 46 and 48 in the arcuate sections 45 and 47 as at 49 (FIGURES 2 and 7) to securely lock the skirt pads 24 and 25 to the inner skirt 35. The skirt surfaces 26 and 27 extend the full length of the arcuate sections 45 and 46 (FIGURE 5) and may extend partially into the first and second shell sections 38 and 39, if desired. It is important, however, that the skirt edges 34 be circumferentially spaced from the piston pin bosses 19 and 20.

When the molten piston material is poured around the inner skirt 35, the skirt will become heated and will expand. As the molten metal cools, the entire piston will contract. The aluminium of the head portion 12 will experience a greater contraction than the steel in the inner skirt 35 due to the different coefficients of thermal expansion. The skirt pads 24 and 25 will be held against contraction by the inner skirt 35. The differing rates of thermal contraction between inner shell 35 and the adjacent head portion 12 will give rise to an area of high stresses. Either at that time or when the oil ring groove 18 is machined into the piston a fissure or crack 51 (FIGURES 2 and 7) will occur in the areas of the thin sections 28 and 29 that formerly connected the skirt pads 24 and 25 to the head portion 12. The fissures 51 will cause the skirts 26 and 27 to be axially separated from the head portion 12.

When the piston 11 is operating in an engine it becomes rapidly heated. The head portion 12, because of its high coefficient of thermal expansion, grows rapidly. The growth is equal in all radial dimensions. The radial growth is not experienced by the skirt pads 24 and 25, however, since they are axially separated from the head portion 12 by the fissures 51. The lower coefficient of thermal expansion of the inner skirt 35 will also assist in retarding the radial growth of the skirts 26 and 27. The skirt pads 24 and 25 will also coact with the inner skirt 35 to function as a bimetallic element. The outer edges of the skirt pads 24 and 25 will curve inwardly from the cylinder wall upon heating to make cam grinding of the skirt surfaces unnecessary.

It is to be understood that this invention is not limited to the exact construction shown and described but that various changes and modifications may be made without departing from the scope of the invention, as defined by the appended claims.

I claim:

1. A light weight piston for an internal combustion engine comprising a head portion having at least one piston ring groove around its circumference, a pair of piston pin bosses integrally connected to said head portion and depending from diametrically opposite sides thereof, said head portion and said piston pin bosses being formed from a light weight metal having a relatively high coefficient of thermal expansion, an inner skirt formed from a more dense metal having a lower coefficient of thermal expansion, said inner skirt extending completely around the circumference of said piston and being embedded in said piston pin bosses, said inner skirt being axially spaced from said head portion, and skirt pads fixed to said inner skirt on opposite sides of said piston, said skirt pads being formed from the same metal as said head portion and said piston pin bosses, said skirt pads being separated from said piston pin bosses in a circumferential direction.

2. A piston for an internal combustion engine comprising a head portion having at least one piston ring groove around its circumference, a pair of piston pin bosses integrally connected to said head portion and depending from diametrically opposite sides thereof, said head portion and said piston pin bosses being formed from a light weight metal having a relatively high coefficient thermal expansion, an inner skirt formed from a more dense metal having a lower coefficient of thermal expansion, said inner skirt extending completely around the circumference of said piston and being embedded in said piston pin bosses, said inner skirt further being axially spaced from said head portion, said inner skirt having a plurality of perforations formed therein in the areas between said piston pin bosses, and first and second skirt pads fixed to said inner skirt on diametrically opposite sides of said piston, said skirt pads being formed from the same metal as said head portion and said piston pin bosses and having parts thereof extending through the perforations in said inner skirt, said skirt pads extending circumferentially of said piston and terminating at spaced circumferential locations from said piston pin bosses whereby said inner skirt provides the sole circumferential connection between said skirt pads and said piston pin bosses.

3. A piston for an internal combustion engine comprising a head portion having at least one piston ring groove around its outer circumference, a pair of piston pin bosses integrally connected to said head portion and depending from opposite sides thereof, said head portion and said piston pin bosses being formed from a light weight metal having a relatively high coefficient of thermal expension, an inner skirt formed from a more dense metal having a lower coefficient of thermal expansion, said inner skirt extending completely around the circumference of said piston and being embedded in said piston pin bosses, said inner skirt being axially spaced from said head portion, said inner skirt extending axially below said piston pin bosses in a plane normal to said piston pin bosses through the center of said piston, said inner skirt decreasing in length from said plane toward said piston pin bosses, and skirt pads affixed to said inner skirt and extending circumferentially on opposite sides of said piston, said skirt pads being circumferentially spaced from said piston pin bosses and being formed from the same metal as said head portion.

4. A light weight cast piston for an internal combustion engine comprising a head portion having a piston ring belt area, a pair of piston pin bosses integrally connected to said head portion and depending from diametrically opposite sides thereof, said head portion and said piston pin bosses being formed from a light weight metal having a relatively high coefficient of thermal expansion, an inner skirt formed from a more dense metal having a lower coefficient of thermal expansion, said inner skirt extending around the circumference of said piston and being embedded in said piston pin bosses during the casting of said piston, and skirt pads fixed by casting to said inner skirt on opposite sides of said piston, said skirt pads being formed from the same metal as said head portion and being integrally connected thereto during casting of said piston by a thin section extending axially between said head portion and said skirt pads, said inner skirt extending axially of said piston and terminating contiguous to but below said thin section for creating a fissure around the circumference of said thin section during the cooling of said piston after casting by the greater thermal contraction of said head portion than that of said inner skirt, said fissure being effective to axially separate said skirt pads from said head portion.

5. A light weight cast piston for an internal combustion engine comprising a head portion having a piston ring belt area around its circumference, a pair of piston pin bosses integrally connected to said head portion and depending from diametrically opposite sides thereof, said piston pin bosses being spaced radially inwardly from the outer circumference of said piston ring groove belt area, aligned piston pin journals formed in said piston pin bosses, said head portion and said piston pin bosses being formed from a light weight metal having a relatively high coefficient of thermal expansion, an inner skirt formed of a more dense metal having a lower coefficient of thermal expansion, said inner skirt having opposing sections extending normally to the piston pin journals of said piston pin bosses and being embedded in said piston pin bosses during the casting of said piston, said opposing sections being connected by circumferentially extending sections on opposite sides of said piston, and skirt pads connected to said circumferentially extending sections, said skirt pads being formed from the same metal as said head portion and said piston pin bosses, said skirt pads extending the circumferential length of the circumferentially extending sections of said inner skirt and no more than partially into said opposing sections to be separated circumferentially from said piston pin bosses.

6. A light weight cast piston for an internal combustion engine comprising a head portion having a piston ring belt area around its circumference, a pair of piston pin bosses integrally connected to said head portion and depending from diametrically opposite sides thereof, said piston pin bosses being spaced radially inwardly from the outer circumference of said piston ring belt area, aligned piston pin journals formed in said piston pin bosses, said head portion and said piston pin bosses being formed from a light weight metal in a relatively high coefficient of thermal expansion, an inner skirt formed with a more dense metal having a lower coefficient of thermal expansion, said inner skirt having opposing first sections extending normally to said piston pin journals and being embedded in said piston pin bosses during the casting of said piston, said first sections being connected by circumferentially extending second sections on opposite sides of said piston, said second sections having a plurality of perforations formed therein, and skirt pads having portions thereof extending through said perforations and secured to said inner skirt thereby during casting of the piston, said skirt pads being formed from the same metal as said head portion and said piston pin bosses, said skirt pads extending the full circumferential length of said second sections and no more than partially into said first sections to be separated circumferentially from said piston pin bosses.

7. A light weight cast piston for an internal combustion engine comprising a head portion having a piston ring belt area around its circumference, a pair of piston pin bosses integrally connected to said head portion and depending from diametrically opposite sides thereof, said piston pin bosses being spaced radially inwardly from the outer circumference of said piston ring belt area, aligned piston pin journals formed in said piston pin bosses, said head portion and said piston pin bosses being formed from a light weight metal having a relatively high coefficient of thermal expansion, an inner skirt having opposing first sections extending normal to said piston pin journals and being embedded in said piston pin bosses during the casting of said piston, said first sections being connected by circumferentially extending second sections on opposite sides of said piston, said second sections extending axially from said piston head area to a point below said piston pin bosses in a plane normal to said piston pin journals through a center of said piston, said second portions decreasing in axial length from said plane toward said first sections, and skirt pads connected to said second sections, said skirt pads being formed from the same metal as said head portion and said piston pin bosses, said skirt pads extending for substantially the same axial length as said second sections, said skirt pads further extending the circumferential length of said second sections and no more than partially into said first sections to be separated circumferentially from said piston pin bosses.

8. A light weight cast piston for an internal combustion engine comprising a head portion having a piston ring belt area around its circumference, a pair of piston pin bosses integrally connected to said head portion and depending from diametrically opposite sides thereof, said piston pin bosses being spaced radially inwardly from the circumference of said piston ring belt area, aligned piston pin journals formed in said piston pin bosses, said head portion and said piston pin bosses being formed from a light weight metal having a relatively high coefficient of thermal expansion, an inner skirt having opposing first sections extending normal to said piston pin journals and being embedded in said piston pin bosses during the casting of said piston, said first sections being connected by circumferentially extending second sections on opposite sides of said piston, said second sections being axially spaced from said head portion, and skirt pads connected to said second sections, said skirt pads being formed from the same metal as said head portion and being connected thereto by a thin section extending axially between said second sections and said head portion during casting of said piston, said skirt pads being axially separated from said head portion by fissures that occur around the circumference of said thin sections during the cooling of said piston after casting by the greater thermal contraction of said head portion than that of said inner skirt.

9. A light weight cast piston for an internal combustion engine comprising a head portion having a piston ring belt area around its circumference, a pair of piston pin bosses integrally connected to said head portion and depending from diametrically opposite sides thereof, said piston pin bosses being spaced radially inwardly from the circumference of said piston ring belt area, aligned piston pin journals formed in said piston pin bosses, said head portion and said piston pin bosses being formed from a light weight metal having a relatively high coefficient of thermal expansion, an inner skirt having opposing first sections extending normal to said piston pin journals and being embedded in said piston pin bosses during the casting of said piston, said first sections being connected by circumferentially extending second sections on opposite sides of said piston, said second sections extending axially from said piston head area to a point below said piston pin bosses in a plane normal to said piston pin journals through a center of said piston, said second portions decreasing in axial length from said plane toward said first sections, and skirt pads connected to said second sections, said skirt pads being formed from the same metal as said head portion and being connected thereto by a thin section during casting of said piston, said skirt pads being axially separated from said head portion by fissures that occur around the circumference of said thin sections during cooling of said piston after casting by the greater thermal contraction of said head portion than that of said inner skirt.

References Cited by the Examiner

UNITED STATES PATENTS 2,238,087  4/41  Bowser _____ 92—228

FOREIGN PATENTS 393,076  6/33  Great Britain.

KARL J. ALBRECHT, *Primary Examiner.*